(12) United States Patent
Pantzar

(10) Patent No.: US 7,189,039 B2
(45) Date of Patent: Mar. 13, 2007

(54) TOOL COUPLING FOR ROTATING TOOLS

(75) Inventor: Göran Pantzar, Arsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 275 days.

(21) Appl. No.: 10/502,766

(22) PCT Filed: Jan. 28, 2003

(86) PCT No.: PCT/SE03/00143

§ 371 (c)(1),
(2), (4) Date: Jan. 21, 2005

(87) PCT Pub. No.: WO03/064087

PCT Pub. Date: Aug. 7, 2003

(65) Prior Publication Data

US 2005/0129477 A1 Jun. 16, 2005

(30) Foreign Application Priority Data

Jan. 29, 2002 (SE) .................................... 0200235

(51) Int. Cl.
*B23B 31/11* (2006.01)
(52) U.S. Cl. .................. 409/234; 408/233; 408/239 R; 279/8; 407/48
(58) Field of Classification Search .................. 408/57, 408/59, 226, 238, 239 A, 239 R, 233; 409/232, 409/233, 234; 279/8, 93, 91, 94, 103; 407/48, 407/103; *B23B 31/11*
See application file for complete search history.

(56) References Cited

U.S. PATENT DOCUMENTS

| 1,571,260 | A | * | 2/1926 | Gairing | ...................... 408/201 |
|---|---|---|---|---|---|
| 2,084,801 | A | * | 6/1937 | Hall | ............................ 409/233 |
| 2,383,688 | A | * | 8/1945 | Seiter | ............................. 279/8 |
| 4,621,960 | A | | 11/1986 | Töllner | |
| 4,748,879 | A | * | 6/1988 | von Haas | ..................... 82/160 |
| 4,934,883 | A | | 6/1990 | Andersson et al. | |
| 5,163,790 | A | * | 11/1992 | Vig | .............................. 408/57 |
| 5,551,811 | A | * | 9/1996 | Satran et al. | .................. 407/40 |
| 5,607,263 | A | * | 3/1997 | Nespeta et al. | ............... 407/61 |
| 5,800,098 | A | * | 9/1998 | Satran et al. | .................. 407/31 |
| 6,695,551 | B2 | | 2/2004 | Silver | |

(Continued)

FOREIGN PATENT DOCUMENTS

DE 367 010 11/1923

(Continued)

*Primary Examiner*—Daniel W. Howell
(74) *Attorney, Agent, or Firm*—Drinker Biddle & Reath LLP

(57) ABSTRACT

A tool assembly includes first and second tool bodies, a tool coupling interconnecting the tool bodies, and a drawing member for drawing the tool bodies together along a common longitudinal axis. The tool coupling includes a male portion disposed on one of the tool bodies, and a female portion disposed on the other of the tool bodies. The male portion has a plurality of tongues spaced apart around the axis, the tongues being flexible in a radial direction with reference to the longitudinal axis. The female portion has a non-circular recess defining a plurality of corner portions receiving respective ones of the flexible tongues for radially steering the tool bodies during axial mating thereof.

15 Claims, 3 Drawing Sheets

U.S. PATENT DOCUMENTS 6,896,450 B2 * 5/2005 Rothenstein .................. 408/59
7,112,021 B2 * 9/2006 Pantzar ....................... 409/234
2004/0213642 A1 * 10/2004 Pantzar ....................... 409/234

FOREIGN PATENT DOCUMENTS

| DE | 202 04 848 | | 7/2002 |
|---|---|---|---|
| EP | 1529587 A1 | * | 5/2005 |
| FR | 2 531 887 | | 2/1984 |

* cited by examiner

TOOL COUPLING FOR ROTATING TOOLS

TECHNICAL FIELD OF THE INVENTION

The present invention relates to a tool coupling for rotary tools for chip removing machining, which tool coupling is intended to interconnect a first tool body and a second tool body. The tool coupling comprises a male part arranged on the first tool body and a female part arranged on the second tool body, whereby the male part and the female part being intended to be in engagement with each other in the operative state of the tool coupling. The tool coupling comprises members arranged to apply an axial, uniting force to the male part and the female part.

PRIOR ART

A tool coupling where a male part cooperates with a female part is previously known from SE-B-457 623 (corresponding to U.S. Pat. No. 4,934,883), whereby the parts are tapering and have non-circular cross-sections. In the operative position of the tool coupling, the male part is received in the female part and at final displacement of the male part in relation to the female part, an elastic deformation of the female part takes place in the area of the open end thereof. Any additional steering (guiding) in the radial direction of the tool coupling, apart from the mutual steering between the male part and the female part, is not to be found in the tool coupling according to SE-B-457 623.

A tool which comprises a male part and a female part, which are conical with a cylindrical cross-section coupling is previously known from U.S. Pat. No. 4,621,960. Furthermore, the tool coupling comprises driver members in the form of pins, which co-operate with recesses. An axially extending screw provides engagement between the male part and the female part, whereby contact is also established between stop faces included in the tool coupling, which are situated at a radial distance from the male and female parts. Said stop faces do not provide any steering in the radial direction of the tool coupling.

AIMS AND FEATURES OF THE INVENTION

A primary aim of the present invention is to provide a tool coupling of the kind defined in the introduction, which coupling is free of play.

An additional aim of the present invention is that the coupling should ensure a high precision, especially in the radial direction with regard to the chip removing machining which is carried out by the cutting inserts for chip removing machining applied on the tool head.

Yet another aim of the present invention is that the tool coupling according to the present invention should be user-friendly as well as automatically adjust the tool bodies which are connected together in mutually correct positions.

At least the primary aim of the present invention is attained by a tool assembly which comprises first and second tool bodies, a tool coupling interconnecting the first and second tool bodies, and a drawing member for drawing the first and second tool bodies together along a common longitudinal axis of the first and second tool bodies. The tool coupling comprises a male portion and a female portion. The male portion is disposed on an axially facing surface of one of the first and second tool bodies. The female portion is disposed on an axially facing surface of the other of the first and second tool bodies. The male portion comprises a plurality of tongues spaced apart around the axis. The tongues are flexible in a radial direction with reference to the longitudinal axis. The female portion comprises a non-circular recess defining a plurality of corner portions receiving respective ones of the flexible tongues for radially steering the first and second tool bodies during axial mating thereof.

BRIEF DESCRIPTION OF THE DRAWINGS

Below an embodiment of the invention will be described, reference being made to the appended drawings, where.

DETAILED DESCRIPTION OF A PREFERRED EMBODIMENT OF THE INVENTION

Figure 1:
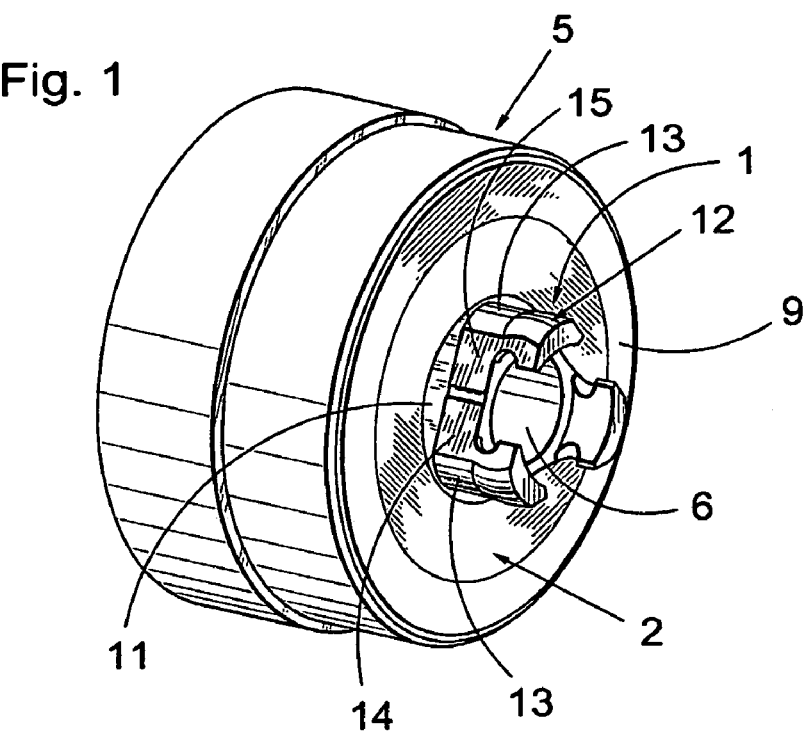
FIG. 1 shows a perspective view of a male part included in the tool coupling according to the present invention, which is arranged on a first tool body.
Figure 2:
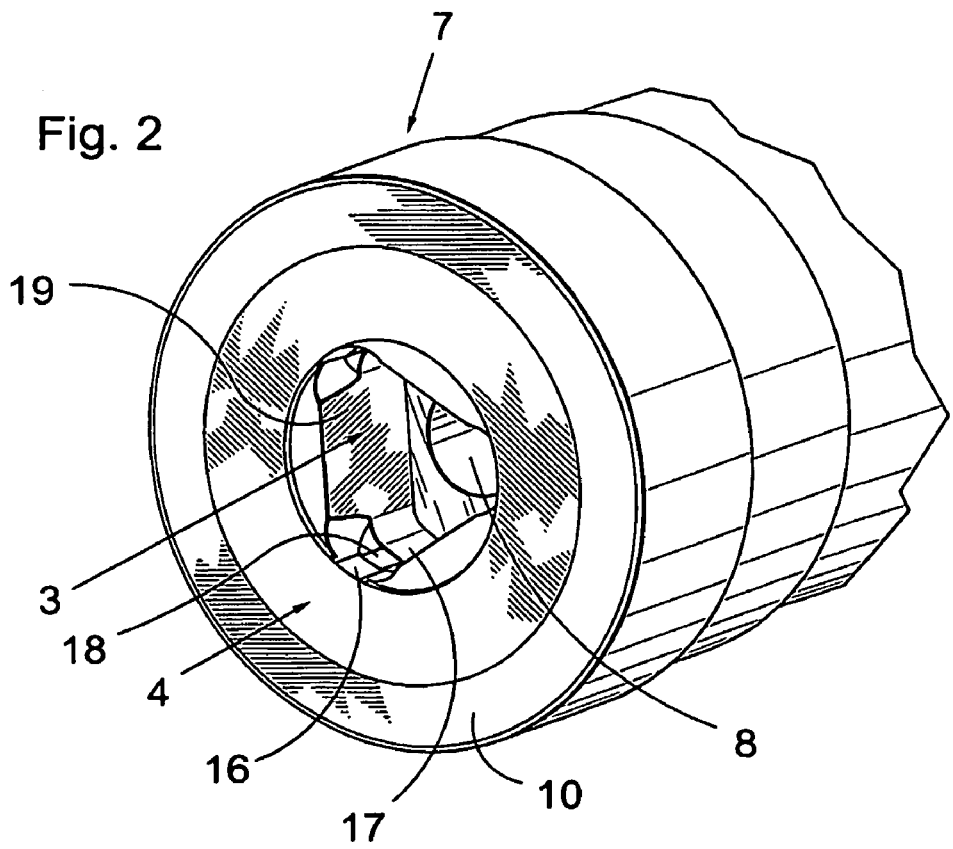
FIG. 2; shows a perspective view of a female part included in the tool coupling according to the present invention, which is arranged on a second tool body and intended to be in engagement with the male part according to FIG. 1.
Figure 3:
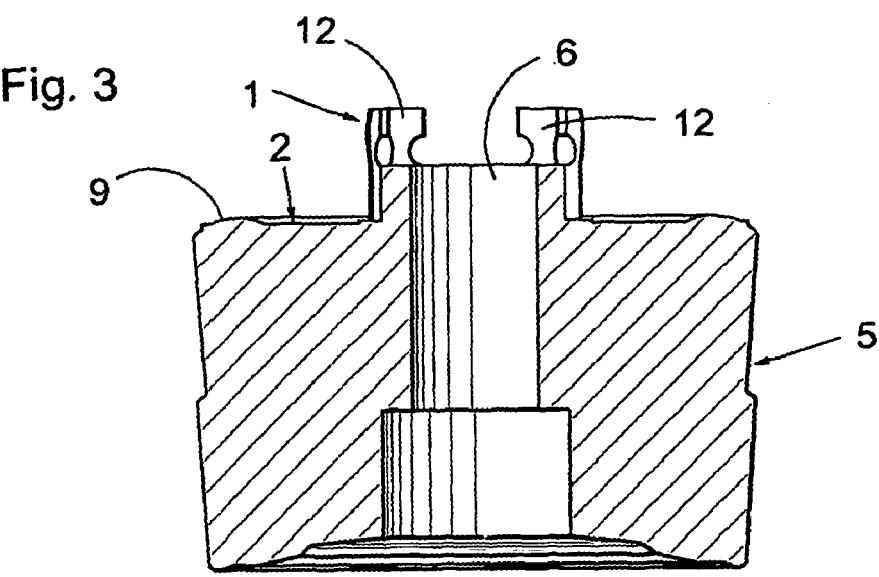
FIG. 3 shows an axial cross-section through the center of the first tool body according to FIG. 1.

The embodiment of a tool coupling according to the present invention illustrated in FIGS. 1 and 2 comprises a male part 1, see FIG. 1, and a female part 3, see FIG. 2. The male part 1 is arranged on a first contact surface 2 of a 15 first tool body 5 and the female part 3 is formed in a second contact surface 4 of a second tool body 7. The first tool body 5 may, for instance, consist of a cutter head while the second tool body 7 may, for instance, consist of an extender or the like. At the end facing away from the female part 3, the second tool body 7 may be provided with some other type of tool coupling, for instance the tool coupling CORO-MANT CAPTO® marketed by AB Sandvik Coromant. The tool bodies 5 and 7 are only schematically illustrated in the present patent application.

In the embodiment illustrated, an axial first center hole 6 extends through the first tool body 5 and an axial second center hole 8 extends through at least a part of the second tool body 7. The first center hole 6 is provided with a step or shoulder 6a, while the second center hole 8 is internally threaded.

Furthermore, the tool coupling according to the present invention comprises a steering arrangement which in the embodiment according to FIGS. 1 and 2 comprises a circular ridge 9, which is arranged on the first contact surface 2 at a certain radial distance from the male part 1, in connection with the circumference of the first tool body 5. Furthermore, the steering arrangement comprises a circular groove 10, which is arranged in the second contact surface 4 at a certain radial distance from the female part 3, in connection with the circumference of the second tool body. How the circular ridge 9 cooperates with the circular groove 10 will be clear from the description below.

Figure 5:
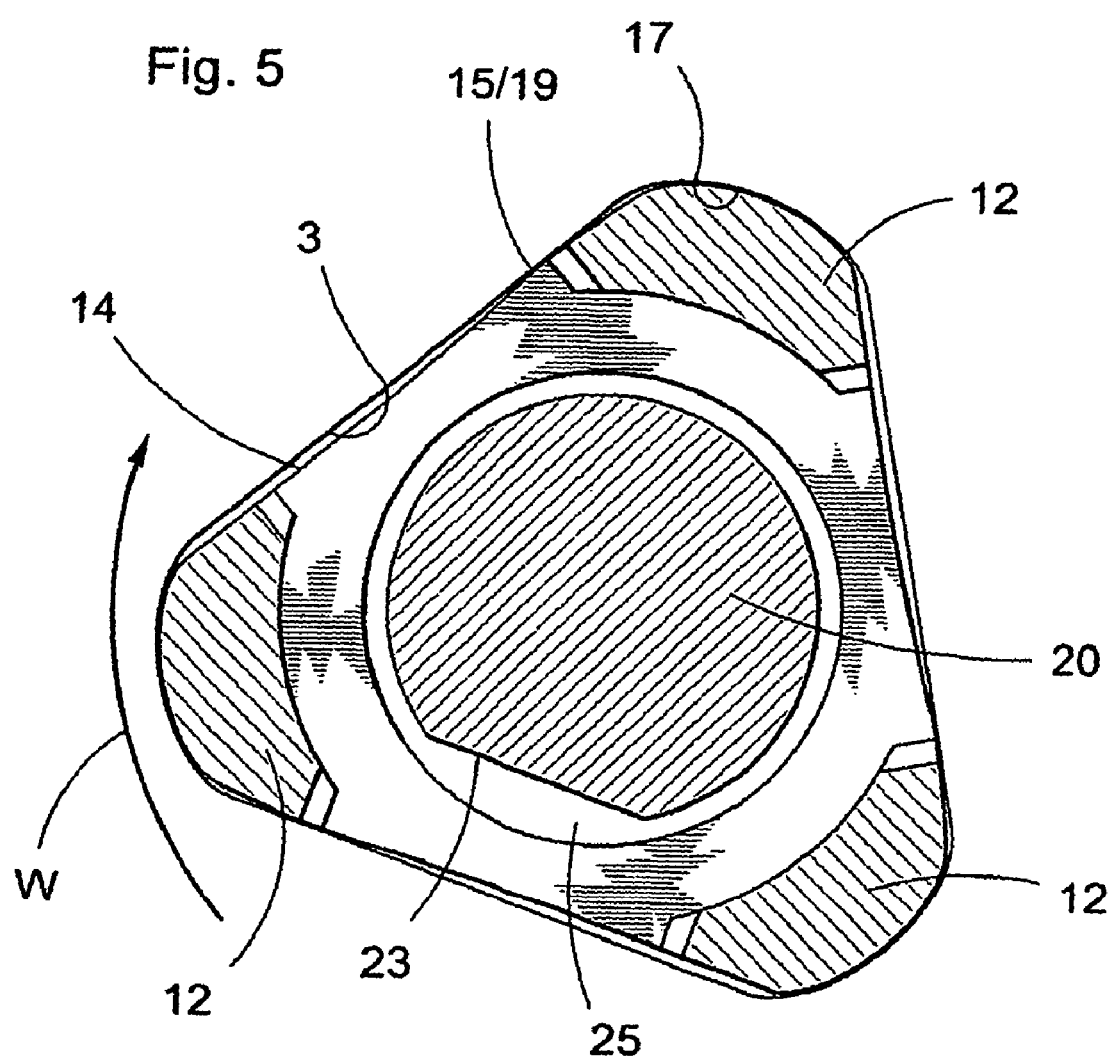
FIG. 5 shows a section, perpendicularly to the axial direction of the tool bodies, through the male part and the female part when the same are in engagement with each other.

As is seen in FIG. 1, the male part 1 comprises a base portion 11 which has a triangular shape, as well as three resilient tongues 12, which extend from the base portion 11 and generally have an extension in the axial direction of the first tool body 5. The three tongues 12 are positioned in the corners 13 of the triangular base portion 11. The corners 13 of the triangular base portion 11 are rounded, i.e., they are convex in the direction of circumference of the male part, whereby also the tongues 12 are convex on the outside thereof both in the direction of circumference of the male part 1 as well as also in the axial direction of the male part 1. The radially outward facing side surfaces of the triangular base portion 11 are divided into two partial surfaces 14, 15, whereby a first partial side surface 14 is planar while a second partial side surface 15 is somewhat convex in the direction of the circumference of the male part 1. This is seen more clearly in the cross-section that is shown in FIG. 5.

The female part 3, see FIG. 2, comprises a recess that has also a generally triangular shape with rounded corners, whereby said corner comprises two partial portions 16 and 17. The first corner portion 16 has a bottom which is situated closer to the circumference of the second tool body 7 (i.e., farther from the center axis) than is the bottom of the second corner portion 17. Also, the bottom of the first corner portion 16 is disposed closer to a mouth (open end) of the recess than is the bottom of the second corner portion 17. Between the bottoms of the corner portions 16 and 17, a transition portion 18 is arranged, which has an extension in the axial direction of the second tool body 7. Between the respective corner portions 16/17, a side surface 19 extends, which preferably is planar.

When the two tool bodies 5 and 7 are to be interconnected, the male part 1 is inserted into the female part 3, whereby the tongues 12 at a first stage bear towards the first corner portions 16 of the female part 3. Then, the tongues 12 slide against the transition portions 18 and climb up to the second corner portions 17. In that connection, the tolerances are such that in an unloaded position the outsides of the tongues 12 are tangential to a circle having a somewhat larger diameter than the circle which is tangential to the second corner portions 17. The difference between the diameter of the circles is suitably on the order of 5/100 mm. This means that the tongues 12 work as an accurate steering (guiding) structure during the final phase when the male part 1 is received in the female part 3.

Figure 4:
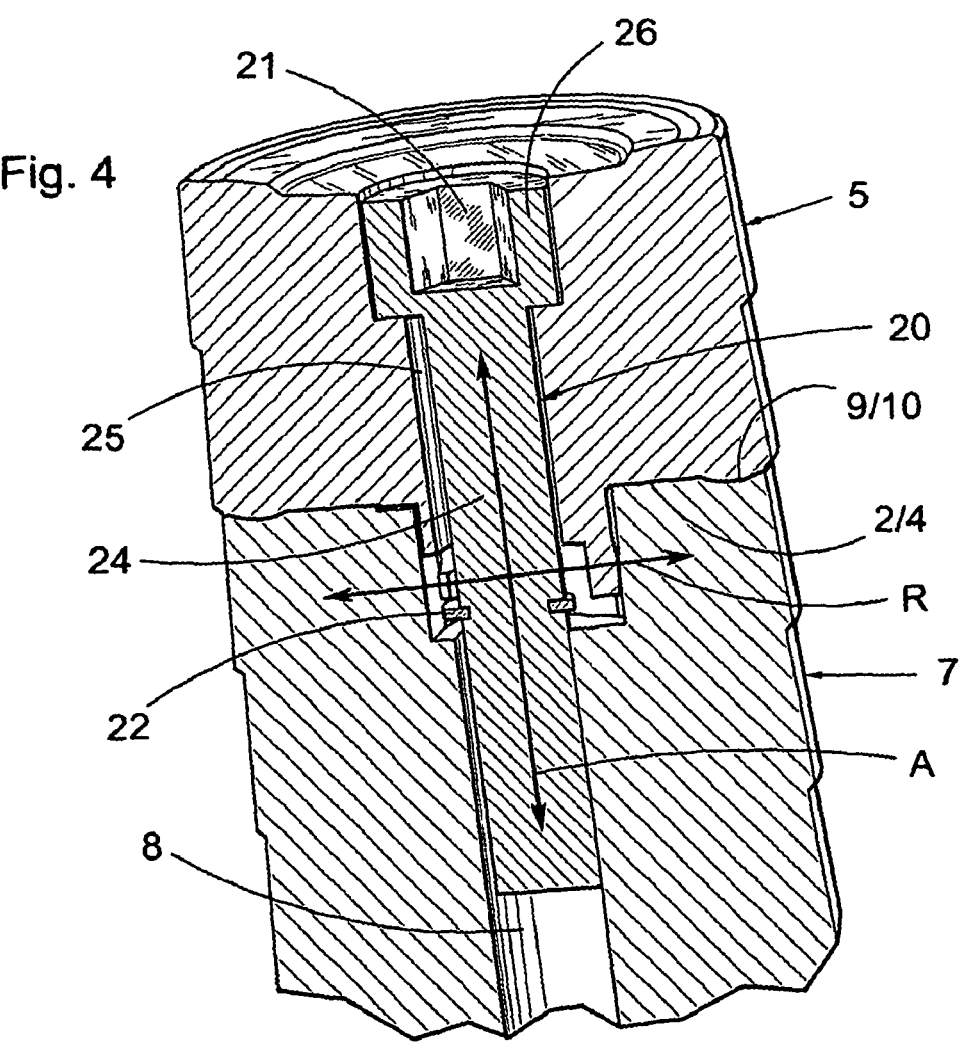
FIG. 4 shows in perspective the two tool bodies in an assembled state, whereby the same are cut axially through the center of the tool bodies.

In FIG. 4, the two tool bodies 5 and 7 are shown in connected position, i.e. the male part 1 is received in the female part 3, whereby the contact surfaces 2 and 4 abut against each other and the circular ridge 9 is received in the circular groove 10. A double arrow A symbolizes the axial direction of the tool while a double arrow R symbolizes the radial direction of the tool. An externally threaded locking screw 20 extending axially is received in the first hole 6 and extends into the second hole 8. The locking screw 20 is in the usual way provided with an internal key recess 21 in order to enable rotation of the locking screw 20, and thereby effect connection of the tool bodies 5 and 7 in a satisfactory way. The locking screw 20 is also provided with a clamp ring 22 which is received in a radial groove in the locking screw 20. The function of said clamp ring 22 will be described below.

Thus, when connecting the two tool bodies 5 and 7, the male part 1 is inserted into the female part 3, whereby during the initial stage the tongues 12 of the male part 1 bear against the corner portions 16 and 17. The displacement of the male part 1 into the female part 3 is effected by rotation of the locking screw 20, whereby the external threaded portion thereof is in engagement with the internally threaded hole 8. When the male part 1 has bottomed in the female part 3, the partial side surfaces 14 and 15 of the male part 1 are exactly opposite the side surface 19 of the female part 3. At this stage, also the contact surfaces 2 and 4 have come to abutment against each other, whereby the ridge 9 of the first tool body 5 is received in the groove 10 of the second tool body 7. By cooperation between the ridge 9 and the groove 10, a mutual steering (guiding) in the radial direction of the two tool bodies 5 and 7 will be effected. By virtue of the flexibility of the tongues 12 as well as the existence of a certain play between the partial side surfaces 14, 15 and the side surface 19 (see FIG. 5), the steering which is achieved by the ridge 9 and the groove 10 will prevail over the steering which is achieved by the tongues 12 and the corner portions 16, 17 and the partial side surfaces 14, 15 and the side surface 19, respectively. Preferably, in the sectional view illustrated in FIG. 4, the ridge 9 has a somewhat smaller curvature radius than the groove 10. As a consequence the requirements regarding precision of the ridge 9 and the groove 10 in practical manufacture are somewhat reduced.

In this connection, it should be pointed out that when a lateral force is applied to the first tool body 5, a mutual lateral displacement of the tool bodies 5, 7 will to an exceptionally high extent, be counteracted by cooperation between the ridge 9 and the groove 10 thanks to the same being kept axially together by the locking screw.

When a rotation is applied to the second tool body 7, the female part 3 will naturally also rotate, whereby the male part 1 and the first tool body 5 are driven along. In this connection reference is made to FIG. 5, which shows a section through the male part 1 and the female part 3 in the operative position of the same parts. As is seen in FIG. 5, where the direction of rotation is marked with W, upon rotation of the female part 3, the side surface 19 will contact the convex partial side surface 15, whereby the rotational force is transferred via said three contact areas 15/19.

FIG. 5 shows clearly that the locking screw 20 is provided with a longitudinal chamfer 23, which preferably extends along the entire shank 24 of the locking screw 20. Said chamfer 23 provides a space 25 between the shank of the locking screw 20 and the holes 6 and 8, whereby cooling medium may be supplied into said space. How the cooling medium is distributed further in the area of the head 26 of the locking screw 20 is not illustrated in FIG. 4. In this connection, it should be pointed out that the design of the locking screw 20, i.e. the arrangement of a longitudinal chamfer 23, may have a general application for tools for chip removing machining where it is important to provide a space for supply of cooling medium.

When the first tool body 5 is to be dismounted from 15 the second tool body 7, the locking screw 20 is rotated in the opposite direction in comparison with when the tool bodies 5, 7 are connected. Then, the clamp ring 22, which projects a distance outside of the circumference of the shank 24, will come into abutment against the first tool body 5 and pulls the same with it, whereby the male part 1 is removed from the female part 3.

In the above-described embodiment of the present invention, the tool bodies 5 and 7 are schematically illustrated in the form of generally cylindrical elements. However, the fact is that in reality the tool bodies 5 and 7 are machined to shapes depending on which type of tool they are to be included in. Then, the periphery of said tool bodies 5 and 7 will normally be interrupted here and there, which in turn means that the circular ridge 9 and the circular groove 10 on the completed tool will not be continuous but interrupted here and there, i.e., the ridge and groove would comprise arc-shaped segments.

Feasible Modifications of the Invention

In the above-described embodiment, the male part 1 is arranged on the first tool body 5, i.e. the part which, for instance, may constitute a cutter head. However, within the scope of the present invention it is also feasible that the female part 3 could be formed in the first tool body 5, whereby in such a case the male part 1 would be arranged on the second tool body, which for instance may constitute an extender.

In connection with the description of the embodiment above, it is stated that the steering which is achieved by the ridge 9 and the groove 10 will prevail over the steering which is achieved by the tongues 12 and the corner portions 16, 17 and the partial side surfaces 14, 15 and the side surface 19, respectively. It has, however, been shown empirically that the steering which is achieved by the ridge 9 and the groove 10 may be spared (omitted) in certain applications, i.e. the steering in the radial direction which is achieved by the tongues 12 and the second corner portions 17, i.e. the corner portions which have a bottom furthest away from the circumference of the second tool body 7, is sufficient. In such a case, the contact surfaces 2 and 4 are entirely planar in those portions which abut against each other, whereby said portions are positioned adjacent to the periphery of the tool bodies.

In the above-described embodiment, the male part 1 has three tongues 12 and the female part 3 has three corner portions 16, 17. However, it is also feasible within the scope of the invention that the male part could have more than three tongues and that the female part would be more than three corner portions. However, in practice, six tongues and six corner portions, respectively, should be the maximal number.

In the above-described embodiment, the ridge 9 and the groove 10 are circular, whereby they, for reasons that have been given above, may be interrupted here and there. However, the ridges and grooves do not need to be arc shaped but they may have another curved shape or even be straight.

The invention claimed is:

1. Tool assembly comprising first and second tool bodies, a tool coupling interconnecting the first and second tool bodies, and a drawing member for drawing the first and second tool bodies together along a common longitudinal axis of the first and second tool bodies;
    the tool coupling comprising a male portion disposed on one of the first and second tool bodies, and a female portion disposed on the other of the first and second tool bodies;
    the male portion comprising a plurality of tongues spaced apart around the axis, the tongues being flexible in a radial direction with reference to the longitudinal axis;
    the female portion comprising a non-circular recess defining a plurality of corner portions receiving respective ones of the flexible tongues for radially steering the first and second tool bodies during axial mating thereof.

2. The tool assembly according to claim 1 wherein the recess has a generally triangular cross section, and the tongues are arranged in a corresponding generally triangular pattern.

3. The tool assembly according to claim 2 wherein each of the corner portions includes first and second partial portions, the first partial portion having a bottom arranged closer to a mouth of the recess and farther from the axis than is a bottom of the second partial portion.

4. The tool according to claim 1 wherein each of the corner portions includes first and second partial portions, the first partial portion having a bottom arranged closer to a mouth of the recess and farther from the axis than is a bottom of the second partial portion.

5. The tool according to claim 1 wherein the tool coupling further includes an additional steering structure for radially steering the first and second tool bodies during axial mating, the additional steering structure disposed radially outside of the tongues and the recess.

6. The tool according to claim 5 wherein the male and female portions are disposed on an axially facing contact surface of the respective tool body, and wherein the additional steering structure comprises a groove formed in one of the axially facing contact surfaces, and a ridge formed in the other axially facing contact surface and received in the groove.

7. The tool assembly according to claim 6 wherein the groove and the projection are circular and coaxial with the axis.

8. The tool assembly according to claim 6 wherein the groove and the projection are generally arc-shaped and coaxial with the axis.

9. The tool assembly according to claim 6 wherein the ridge and the groove are situated adjacent to radially outer edges of the respective axially facing surfaces.

10. The tool assembly according to claim 1 wherein the male portion includes at least one generally radially outwardly facing side surface which is of convex shape in a circumferential direction of the male portion.

11. The tool assembly according to claim 1 wherein the drawing member comprises a screw.

12. The tool assembly according to claim 11 wherein the screw extends coaxially with the axis and passes into aligned holes formed in the first and second tool bodies, respectively, and is threadedly attached to one of the holes.

13. The tool assembly according to claim 12 wherein the first and second holes together define a passage for cooling medium, an outer periphery of the screw being longitudinally chamfered to form a space for conducting the cooling medium.

14. The tool assembly according to claim 12 wherein the male and female portions are disposed on an axially facing contact surface of the respective tool body, the screw including a shank having a threaded portion at one end, a head at another end, and a radial outward projection disposed between the threaded portion and the head and arranged to engage one of the axially facing contact surfaces to separate the first and second tool bodies during unscrewing of the screw.

15. The tool assembly according to claim 14 wherein the projection comprises a ring disposed in a groove of the shank.

* * * * *